United States Patent [19]

Holmberg

[11] Patent Number: 4,590,109

[45] Date of Patent: May 20, 1986

[54] PAD OF PAPER SHEETS WITH PRESSURE-SENSITIVE ATTACHMENT EDGE PORTION AND METHOD OF MAKING THE SAME

[75] Inventor: Thomas A. Holmberg, Richfield, Minn.

[73] Assignee: The Holmberg Company, Minneapolis, Minn.

[21] Appl. No.: 713,811

[22] Filed: Mar. 20, 1985

[51] Int. Cl.[4] .......................... B32B 3/02; B32B 29/00

[52] U.S. Cl. ...................................... 428/40; 156/247; 156/268; 428/136; 428/138; 428/161; 428/194

[58] Field of Search ................... 428/40, 41, 157, 189, 428/194, 161, 138, 136, 155; 156/249, 247, 292, 248, 268; 282/2, 3 R, 10, 11; 281/3 R, 15 R, 16

[56] References Cited

U.S. PATENT DOCUMENTS

| | | | |
|---|---|---|---|
| 807,465 | 12/1905 | Holmes | 282/10 |
| 1,069,625 | 8/1913 | McKay | 282/10 |
| 3,088,754 | 5/1963 | Burgmer | 282/11 |
| 4,447,481 | 5/1984 | Holmberg et al. | 428/40 |

*Primary Examiner*—Paul J. Thibodeau
*Attorney, Agent, or Firm*—John W. Adams

[57] ABSTRACT

A pad of bound-together individual sheets having a reusable pressure-sensitive adhesive applied to the bound-together edge portion thereof and provided with a removable attachment strip to facilitate the binding of the sheets into a convenient pad for removal and use, and method of making the same.

3 Claims, 3 Drawing Figures

PAD OF PAPER SHEETS WITH PRESSURE-SENSITIVE ATTACHMENT EDGE PORTION AND METHOD OF MAKING THE SAME

BACKGROUND OF THE INVENTION

In the past, a number of different products have been developed which include the use of a pressure-sensitive adhesive strip along one edge of each sheet to facilitate attachment of each sheet to the adjacent sheet to form a pad of note sheets. Such a product is currently sold by the Minnesota Mining and Manufacturing Co. of St. Paul, Minn. under the trademark POST IT. Also, a product embodying a removable protective backer strip covering a pressure-sensitive adhesive portion of a larger sheet is embodied in the invention disclosed and claimed in applicant's U.S. Pat. No. 4,447,481.

SUMMARY OF THE INVENTION

The present invention includes a plurality of individual sheets removably attached along a marginal edge portion thereof by a connecting strip to which each sheet is removably attached by a reusable strip of pressure-sensitive adhesive applied along a marginal edge portion of each sheet, wherein the method of manufacture includes initially applying a strip of reusable adhesive to the marginal edge portion of each of a plurality of sheets of paper and covering the adhesive with removable attachment strip, slitting the paper sheet through the adhesive portion thereof without slitting the underlying portion of the connecting strip, whereby the paper sheet may be readily removed from the connecting strip, to provide a "tab on" sheet of paper having a strip of reusable, pressure-sensitive adhesive applied along one edge portion thereof while leaving the other sheets connected to the pad.

DETAILED DESCRIPTION OF THE PREFERRED EMBODIMENT

Figure 1:
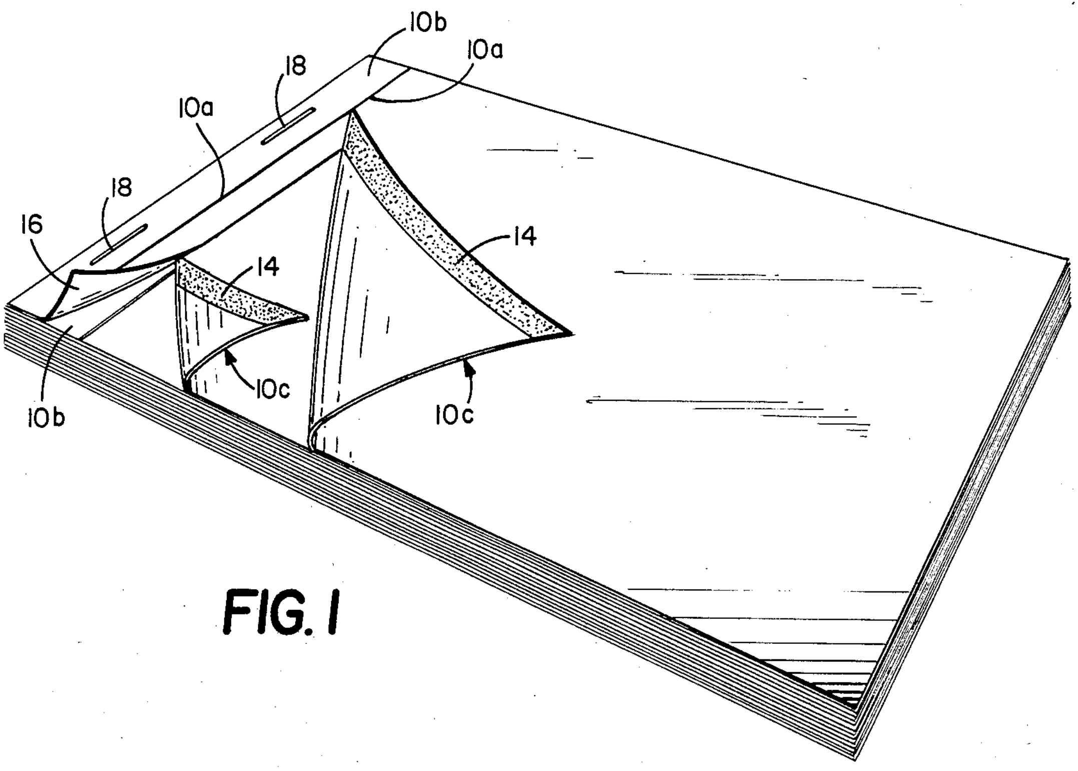
FIG. 1 is a perspective view of a pad of sheets embodying this invention.
Figure 2:
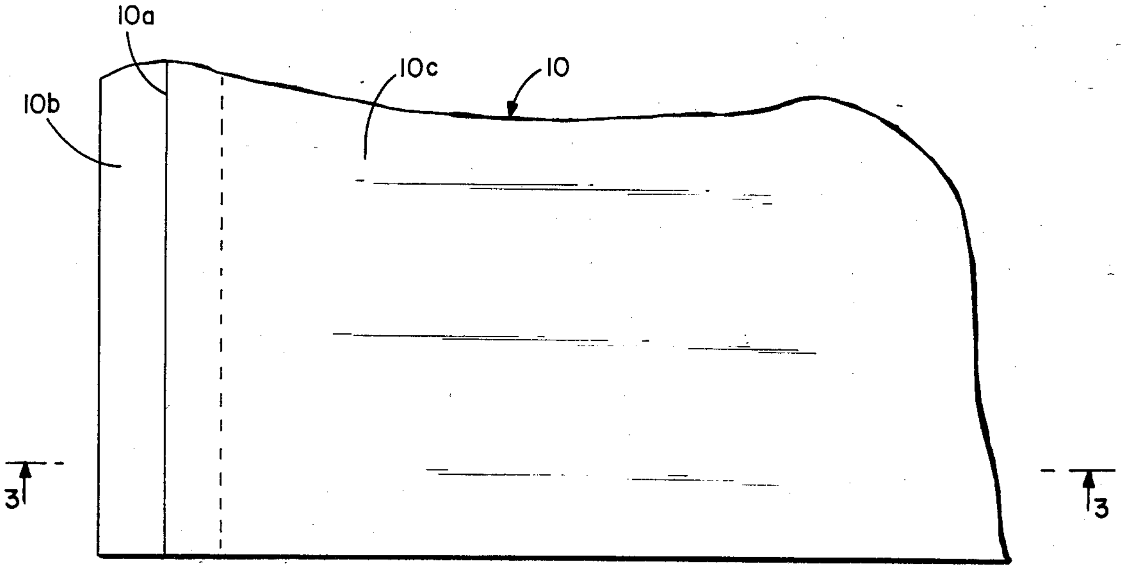
FIG. 2 is a fragmentary plan view of a single sheet embodying the invention.
Figure 3:
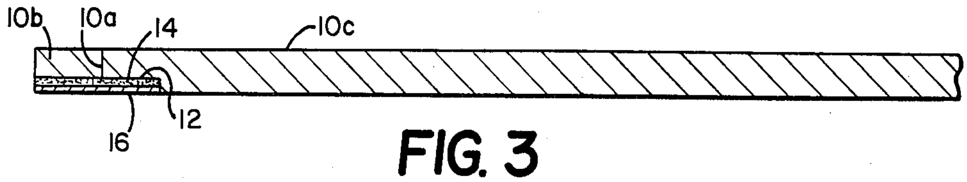
FIG. 3 is a sectional view of an individual sheet taken substantially along the line 3—3 of FIG. 2.

As shown in the accompanying drawings, I provide a pad of removably connected sheets, each designated as an entirety by the numeral 10. Each sheet 10 has an indentation 12 along one marginal edge portion thereof with a ribbon of pressure-sensitive adhesive 14 applied in the indentation and having an attachment strip 16 also applied in the indentation and normally covering the surface of the pressure-sensitive adhesive layer as illustrated. The sheet 10 has a slit 10*a* provided therein after the attachment strip has been applied to permit the sheet to be readily removed from the attachment strip 16 while permitting the attachment strip to bind a plurality of said sheets together by any suitable means such as being stapled together as shown. The slit 10*a* forms a separation line which does not extend through the attachment strip 10 so that the attachment strip 16 securely attaches the two segments 10*b* and 10*c* of the sheet together as illustrated. The removable segments 10*c* of the sheets 10 can be readily peeled off from the attachment strips 16 as illustrated to provide an individual sheet having an exposed pressure-sensitive adhesive ribbon 14 along one edge thereof to permit a supplemental note to be readily attached to another sheet in the same manner as in the Minnesota Mining and Manufacturing note sheets marketed under its trademark POST-IT note pads. Each attachment strip 16 remains intact and attached to the remaining strips 16, the segment 10*b* and removable setment 10*c* of each sheet 10 of the pad. The strip 10 is sufficiently flexible to permit the remaining removable sheet segments 10*c* to be readily removed from the pad and their respective attachment strips.

The individual sheets with the protective attachment strips 16 can be initially produced in the same manner as described in applicant's prior U.S. Pat. No. 4,447,481 and the slit 10*a* through the paper sheet 10 (but not extending through the attachment strip 16) can also be formed during the individual sheet manufacturing process with any conventional type of slitting apparatus well known in the industry. One advantage to this assembly thus produced is that it can be readily processed on conventional sheet-processing equipment such as printing equipment, prior to the assembly of a plurality of sheets into a pad assembly. This is possible only because the thickness of each sheet is uniform throughout the entire surface thereof because of the indented adhesive strip and overlying protective strip as described. If the adhesive and protective strip were not indented, the stack of sheets being processed in the printer or other processing equipment would necessarily be substantially thicker along one edge thereof and this would render the feeding equipment for the printer or other processer essentially inoperative.

By providing the slit 10*a* through the paper sheet but not through the attachment strip 16, the entire sheet remains connected into a single unit during the printing or other processing and permits a plurality of sheets to be easily connected together to form the pad assembly previously described. Any means for connecting the sheets together may be provided, such as the staples 18 shown in FIG. 1.

The method of manufacture includes initially applying a strip of reusable adhesive to the marginal edge portion of each of a plurality of sheets of paper and covering the adhesive with a removable attachment strip, slitting the paper sheet through the adhesive portion thereof without slitting the underlying portion of the connecting strip, whereby the paper sheet may be readily removed from the connecting strip, to provide a "tab on" sheet of paper having a strip of reusable, pressure-sensitive adhesive applied along one edge portion thereof while leaving the other sheets connected to the pad.

It is to be understood that while there has been illustrated and described certain forms of the present invention, the invention is not to be limited to the specific form or arrangement of parts herein described and shown except to the extent that such limitations are found in the claims.

What is claimed is:

1. The method of manufacturing a pad of connected paper sheets including a plurality of sheets, each having a recess formed along one marginal edge portion thereof, applying a reusable layer of pressure-sensitive adhesive in the recess, covering the pressure-sensitive adhesive layer with an attachment strip, the combined thickness of the adhesive and the attachment strip being no greater than the depth of the recess, forming a separation slit in each sheet through overlying relation to the adhesive layer and the attachment strip but of insufficient depth to sever the attachment strip, to thus divide the sheet into two segments, an attachment segment and a removable segment, and connecting the attachment portions and the respective attachment strips together to form a pad of a plurality of said sheet assemblies.

2. A paper sheet comprising, an attachment marginal edge portion, a recess formed along said attachment edge portion having a predetermined depth, a layer of non-drying, pressure-sensitive adhesive applied only in the recessed marginal edge portion, a protective strip removably applied to the layer of adhesive in said recess, the combined thickness of the adhesive and protective strip being no greater than the depth of the recess so that the thickness of the attachment marginal edge portion of the paper sheet is no thicker than the remaining portion of the sheet to permit processing of the sheet through a conventional processing operation such as printing and copying in a conventional manner, and a separation slit through the paper sheet in overlying relation to an intermediate portion of said protective strip to divide the paper sheet into an attachment segment and a separate removable segment connected only by the protective strip.

3. A plurality of sheets having the structure set forth in claim 2 positively connected together along the attachment segment of each sheet to permit removal of the removable segment by removing the same from the portion of the attachment strip overlying the adhesive surface and thus separating the two segments of the sheet.

* * * * *